(12) United States Patent
Hung

(10) Patent No.: US 9,164,243 B2
(45) Date of Patent: Oct. 20, 2015

(54) OPTICAL COUPLING LENS AND METHOD FOR TESTING SAME

(71) Applicant: HON HAI PRECISION INDUSTRY CO., LTD., New Taipei (TW)

(72) Inventor: Yi Hung, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 0 days.

(21) Appl. No.: 14/314,707

(22) Filed: Jun. 25, 2014

(65) Prior Publication Data

US 2015/0002839 A1    Jan. 1, 2015

(30) Foreign Application Priority Data

Jun. 27, 2013 (TW) ............................. 102122949 A

(51) Int. Cl.
*G02B 6/32* (2006.01)
*G01M 11/02* (2006.01)
*G02B 6/42* (2006.01)

(52) U.S. Cl.
CPC ............. *G02B 6/32* (2013.01); *G01M 11/0221* (2013.01); *G02B 6/4214* (2013.01)

(58) Field of Classification Search
CPC .... G01M 11/02; G01M 11/0221; G02B 6/26; G02B 6/262; G02B 6/32; G02B 17/0876; G02B 17/0868; G02B 27/283

USPC ............... 356/124–127; 385/33, 35; 359/726, 359/664, 653, 652, 566, 618
See application file for complete search history.

(56) References Cited

U.S. PATENT DOCUMENTS

| 8,787,715 | B2* | 7/2014 | Hung | 385/33 |
| 8,976,346 | B2* | 3/2015 | Hung | 356/218 |
| 9,000,352 | B2* | 4/2015 | Sun et al. | 250/216 |
| 2011/0097037 | A1* | 4/2011 | Kuznia et al. | 385/33 |
| 2014/0168496 | A1* | 6/2014 | Hung | 348/335 |
| 2015/0062565 | A1* | 3/2015 | Hung | 356/124 |

* cited by examiner

*Primary Examiner* — Hoa Pham
(74) *Attorney, Agent, or Firm* — Novak Druce Connolly Bove + Quigg LLP

(57) ABSTRACT

An optical coupling lens includes a main portion and two reference portions. The main portion includes a first surface having at least one first converging lens formed thereon, a second surface having at least one second converging lenses formed thereon, and a reflecting surface. The second surface is substantially perpendicular to the first surface. An angle between the reflecting surface and the first surface is about 45 degrees. An optical axis of the first converging lens is substantially perpendicular to the first surface, and an optical axis of the second converging lens is substantially perpendicular to the second surface. Each reference portion includes a reference member. The reference member includes a reference point. A connecting line of the reference points of the reference portions is substantially parallel to the first surface and the second surface, and the connecting line is in a surface substantially coplanar with the reflecting surface.

11 Claims, 4 Drawing Sheets

OPTICAL COUPLING LENS AND METHOD FOR TESTING SAME

FIELD

The present disclosure relates to optical communication devices, and particularly to an optical coupling lens and a method for testing the optical coupling lens.

BACKGROUND

In optical communication devices, an optical coupling lens is employed to couple optical signals between an optical emitter/receiver and an optical fiber. The optical coupling lens includes a light incident surface, a light emergent surface, and a reflecting surface. The reflecting surface is for reflecting optical signals between the light incident surface and the light emergent surface. The optical coupling lens includes at least one first converging lens formed on the light incident surface, and at least one second converging lens formed on the light emergent surface.

BRIEF DESCRIPTION OF THE DRAWING

The components of the drawing are not necessarily drawn to scale, the emphasis instead being placed upon clearly illustrating the principles of the embodiments of the present disclosure.

DETAILED DESCRIPTION

Figure 1:
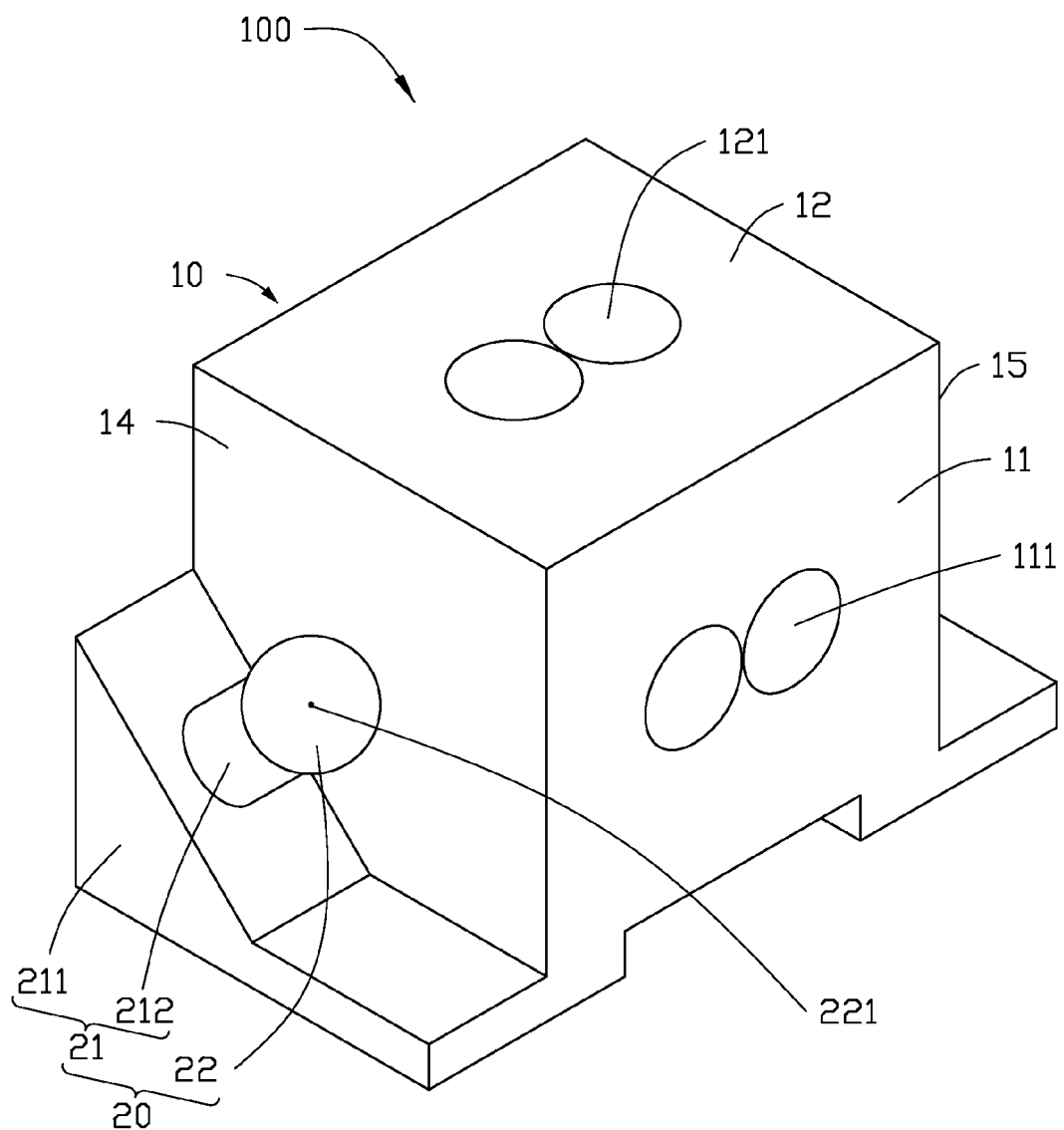
FIG. 1 is an isometric view of an embodiment of an optical coupling lens.
Figure 2:
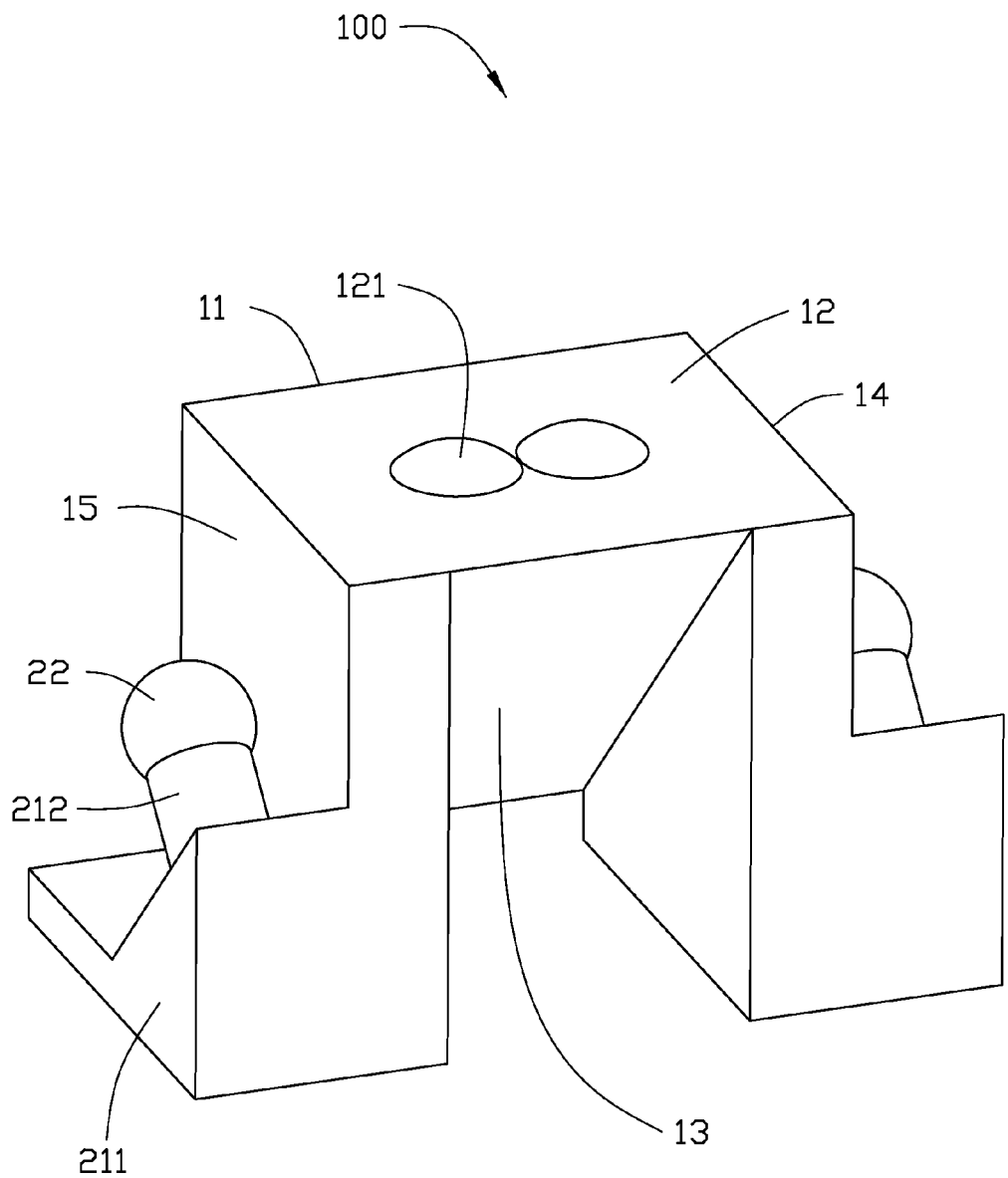
FIG. 2 is similar to FIG. 1, but viewed from another angle.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The references "a plurality of" and "a number of" mean "at least two."

FIGS. 1-4 illustrate an exemplary embodiment of an optical coupling lens 100 of the present disclosure. The optical coupling lens 100 includes a main portion 10 and two reference portions 20.

The main portion 10 includes a first surface 11, a second surface 12, a reflecting surface 13, a first end surface 14, and a second end surface 15. The second end surface 15 is opposite to the first end surface 14. The first surface 11 is substantially perpendicular to the second surface 12. An angle between the reflecting surface 13 and the first surface 11 is substantial 45 degrees, and an angle between the reflecting surface 13 and the second surface 12 is substantial 45 degrees.

The main portion 10 includes two first converging lenses 111 located on the first surface 11, and two second converging lenses 121 located on the second surface 12. Each of the first converging lenses 111 corresponds to one of the second converging lenses 121. An optical axis of each first converging lens 111 is substantially perpendicular to the first surface 11, and an optical axis of each second converging lens 121 is substantially perpendicular to the second surface 12. Thus, the optical axis of each first converging lens 111 is substantially perpendicular to the optical axis of each second converging lens 121. In this embodiment, the first and second converging lenses 111, 121 are convex lenses, and the first and second converging lenses 111, 121 are substantially circular. It is understood that a number of the first and second converging lenses 111, 121 is not limited by this embodiment and can be changed according to different requirements.

In this embodiment, the first end surface 14 is substantially parallel to the second end surface 15. Therefore, the first surface 11, the second surface 12, the reflecting surface 13, the first end surface 14, and the second end surface 15 of the main portion 10 cooperatively form a triangular prism. The optical axes of both the first converging lenses 111 and the second converging lenses 121 are substantially perpendicular to the first and second end surfaces 14, 15.

Each reference portion 20 includes a supporting member 21 connected to the main portion 10, and a reference member 22 supported on the supporting member 21. The supporting member 21 supports the reference member 22 at a predetermined position. In this embodiment, the supporting member 21 includes a protrusion block 211 protruding from the main portion 10, and a supporting bar 212 connected to the protrusion block 211. The reference member 22 is supported on an end of the supporting bar 212. In this embodiment, a lengthwise direction of the supporting bar 212 is substantially perpendicular to the reflecting surface 13. Shapes of both the protrusion block 211 and the supporting bar 212 can be changed according to different requirements, as long as the reference member 22 is supported at the predetermined position by the supporting member 21.

Figure 3:
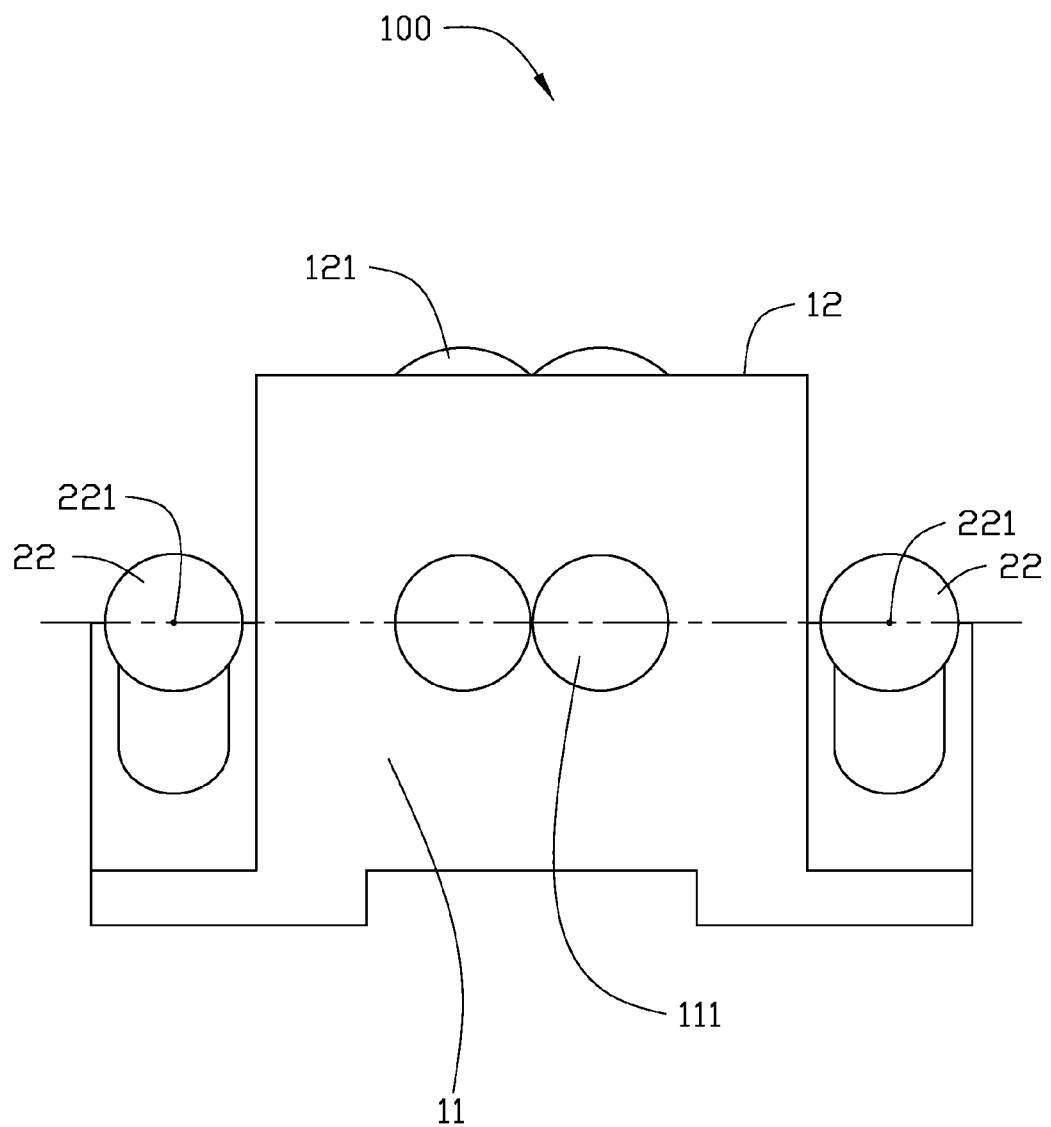
FIG. 3 is a front view of the optical coupling lens of FIG. 1.
Figure 4:
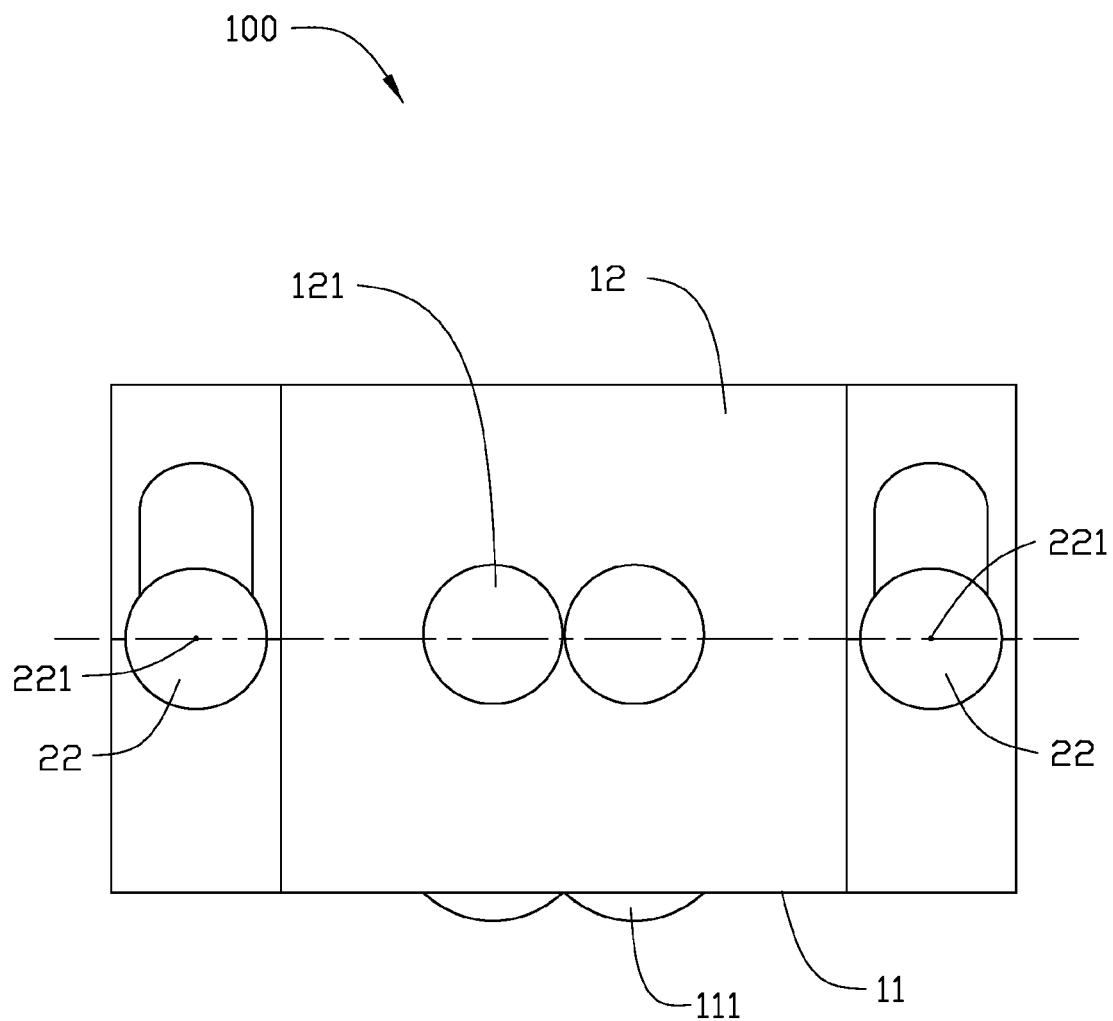
FIG. 4 is a top view of the optical coupling lens of FIG. 1.

Referring to FIGS. 3-4, the reference member 22 serves to determine a position relationship between the first and second converging lenses 111, 121. Each reference member 22 includes a reference point 221. A connecting line between the reference points 221 of the reference members 22 is substantially parallel to the first surface 11 and the second surface 12, and the connecting line is in a surface substantially coplanar with the reflecting surface 13. The reference point 221 can be a point determined by a geometric shape of the corresponding reference member 22, or the reference point 221 can be a point marked on the reference member 22.

In this embodiment, the reference members 22 are substantially spherical, and each reference point 221 is marked on the corresponding reference member 22.

In this embodiment, one reference portion 20 is located adjacent to the first end surface 14, and the other reference portion 20 is located adjacent to the second end surface 15. Alternatively, the reference portions 20 can both be located at one side of the first end surface 14 or one side of the second end surface 15, as long as the connecting line between the reference points 221 of the reference members 22 is substantially parallel to the first surface 11 and the second surface 12, and located in the surface substantially coplanar with the reflecting surface 13.

When the optical coupling lens 100 is manufactured, a position relationship between the first converging lenses 111 and the seconds converging lenses 121 can be tested by the reference portions 20. In detail, in a front view of the optical coupling lens 100 (FIG. 3), if center points of the first converging lenses 111 are both on the connecting line of the reference points 221, it can be determined that the first converging lenses 111 are in predetermined positions. If one or more of the center points of the first converging lenses 111 are on the connecting line of the reference points 221, the positions of the first converging lenses 111 can be adjusted until the center points of both the first converging lenses 111 are on the connecting line of the reference points 221. In a top view of the optical coupling lens 100 (FIG. 4), if center points of the second converging lenses 121 are both on the connecting line of the reference points 221, it can be determined that the second converging lenses 121 are in predetermined positions, and the first converging lenses 111 and the second converging lenses 121 have a predetermined position relationship. If one or more of the center points of the second converging lenses 121 are on the connecting line of the reference points 221, positions of the second converging lenses 121 can be adjusted until the center points of both the second converging lenses 121 are on the connecting line of the reference points 221. Therefore, it is easy to determine whether the positions of both the first converging lenses 111 and the second converging lenses are satisfied. Further, a position relationship between the first converging lenses 111 and the second converging lenses 121 can be easily and visibly determined.

In this embodiment, the reference portions 20 are integrally formed with the main portion 10. Alternatively, the reference portions 20 can be detachably connected to the main portion 10 in other embodiments. Thus, the reference portions 20 can be reusable in testing different optical coupling lenses 100.

It is believed that the present embodiments and their advantages will be understood from the foregoing description, and it will be apparent that various changes may be made thereto without departing from the scope of the disclosure or sacrificing all of its material advantages, the examples hereinbefore described merely being exemplary embodiments of the disclosure.

What is claimed is:

1. An optical coupling lens, comprising:
    a main portion comprising:
        a first surface having at least one first converging lens formed thereon, an optical axis of the first converging lens being substantially perpendicular to the first surface;
        a second surface having at least one second converging lenses formed thereon, the second surface being substantially perpendicular to the first surface, and an optical axis of the second converging lens being substantially perpendicular to the second surface; and
        a reflecting surface for reflecting optical signals between the first converging lens and the second lens, an angle between reflecting surface and the first surface is substantial 45 degrees; and
    two reference portions each comprising a reference member, the reference member comprising a referencing point, a connecting line of reference points of the reference portions being substantially parallel to the first surface and the second surface, and the connecting line being in a surface coplanar with the reflecting surface.

2. The optical coupling lens of claim 1, wherein the main portion further comprises a first end surface and a second end surface opposite to the first end surface, the reference portions are positioned on the first end surface and the second end surface, respectively.

3. The optical coupling lens of claim 2, wherein the first end surface and the second end surface are substantially parallel to each other, and the first end surface and the second end surface are substantially perpendicular to the first surface, the second surface, and the reflecting surface.

4. The optical coupling lens of claim 1, wherein the reference member is substantially spherical-shaped, and the reference point of the reference member is a center of the reference member.

5. The optical coupling lens of claim 1, wherein each reference portion comprises a supporting member connected to the main portion, the supporting bar supports a corresponding reference member thereon.

6. The optical coupling lens of claim 5, wherein each supporting member comprises a protrusion block protruding from the main portion and a supporting bar connected to the protrusion block, reference member is supported on an end of the supporting bar facing away from the protrusion block.

7. The optical coupling lens of claim 1, wherein a lengthwise direction of the supporting bar is substantially perpendicular to the reflecting surface.

8. A method for testing an optical coupling lens, the optical coupling lens comprising a main portion and two reference portions, the main portion comprising a first surface having at least one first converging lens formed thereon, a second surface having at least one second converging lenses formed thereon, and a reflecting surface for reflecting optical signals between the first converging lens and the second lens, an optical axis of the first converging lens being substantially perpendicular to the first surface, the second surface being substantially perpendicular to the first surface, and an optical axis of the second converging lens being substantially perpendicular to the second surface, an angle between reflecting surface and the first surface is substantial 45 degrees, the reference portions each comprising a reference member, the reference member comprising a referencing point, a connecting line of reference points of the reference portions being substantially parallel to the first surface and the second surface, and the connecting line being in a surface coplanar with the reflecting surface, the method comprising:
    determining whether a center point of the first converging lens being on a connecting line of the reference points of the reference members, viewing from an angle substantially perpendicular to the first surface; and
    determining whether a center point of the second converging lens being on a connecting line of the reference points of the reference members, viewing from an angle substantially perpendicular to the first surface.

9. The method of claim 8, wherein if the center point of the first converging lens is on the connecting line of the reference points, it is determined that the first converging lens is at a predetermined positions.

10. The method of claim 9, wherein if the center point of the second converging lens is on the connecting line of the reference points, it is determined that the second converging lens is at a predetermined positions and the first converging lenses 111 and the second converging lenses have a predetermined position relationship.

11. An optical coupling lens comprising:
    a first surface having at least one first converging lens formed thereon, an optical axis of the first converging lens being substantially perpendicular to the first surface;
    a second surface having at least one second converging lenses formed thereon, the second surface being substantially perpendicular to the first surface, and an optical axis of the second converging lens being substantially perpendicular to the second surface;
    a reflecting surface for reflecting optical signals between the first converging lens and the second converging lens, the reflecting surface forming an angle with the first surface which is substantially 45 degrees; and
    two reference portions, each comprising a reference member having a referencing point,
    wherein a line connecting the reference portions is substantially parallel to the first and second surfaces, and resides in a surface which is coplanar with the reflecting surface.

* * * * *